United States Patent [19]

Nakamura

[11] Patent Number: 4,571,034
[45] Date of Patent: Feb. 18, 1986

[54] LENS SYSTEM FOR OPTICAL RECORDING TYPE DISKS

[75] Inventor: Toru Nakamura, Tokyo, Japan

[73] Assignee: Olympus Optical Co., Ltd., Tokyo, Japan

[21] Appl. No.: 515,875

[22] Filed: Jul. 21, 1983

[30] Foreign Application Priority Data

Aug. 5, 1982 [JP] Japan ................... 57-135660

[51] Int. Cl.$^4$ ............................................. G02B 13/08
[52] U.S. Cl. ................................................. 350/432
[58] Field of Search ..................................... 350/432

[56] References Cited

U.S. PATENT DOCUMENTS 4,027,952 6/1977 Hugues ............................. 350/432
4,449,792 5/1984 Arai et al. ........................ 350/432

FOREIGN PATENT DOCUMENTS 55-45084 3/1980 Japan .
57-64714 4/1982 Japan .
57-76512 5/1982 Japan .

Primary Examiner—John K. Corbin
Assistant Examiner—P. M. Dzierzynski
Attorney, Agent, or Firm—Cushman, Darby & Cushman

[57] ABSTRACT

A compact and light-weight lens system for optical recording type disks comprising only one lens element and arranged to have favorably corrected aberrations and a long working distance by forming both surfaces of the lens element as aspherical surfaces.

8 Claims, 9 Drawing Figures

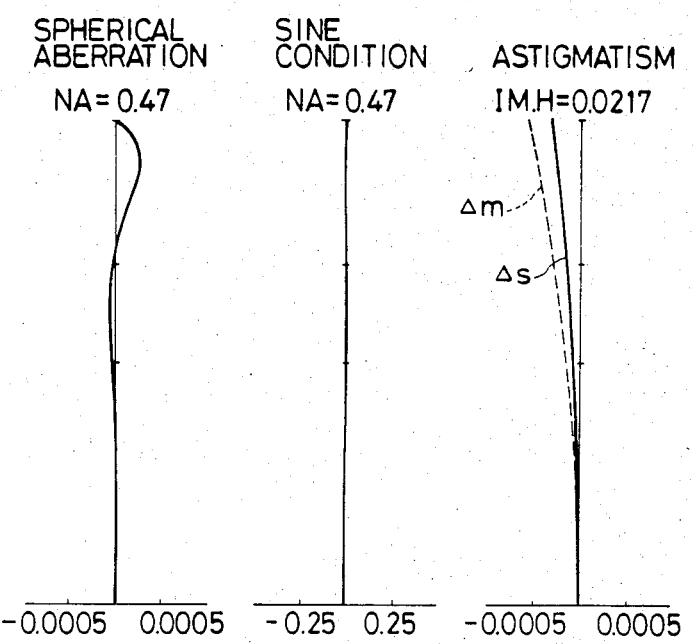
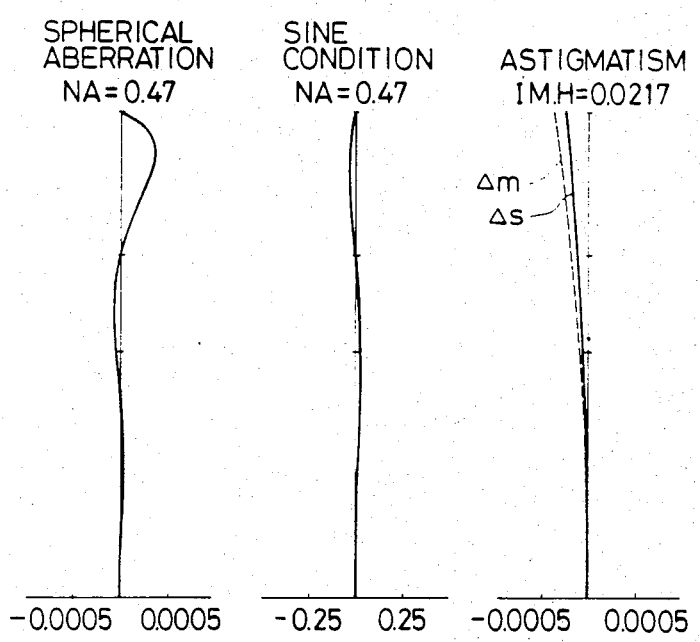

FIG. 9
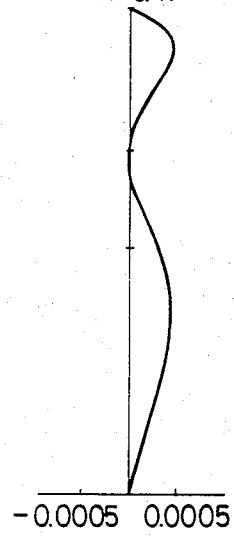
SPHERICAL
ABERRATION
NA=0.47
-0.0005  0.0005
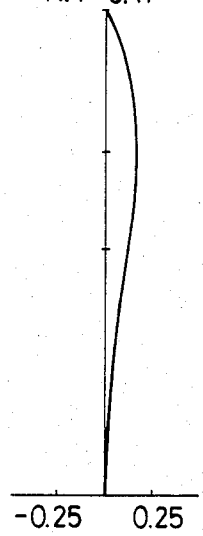
SINE
CONDITION
NA=0.47
-0.25  0.25
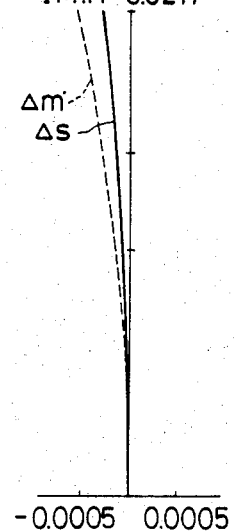
ASTIGMATISM
IM.H=0.0217
Δm
Δs
-0.0005  0.0005

LENS SYSTEM FOR OPTICAL RECORDING TYPE DISKS

BACKGROUND OF THE INVENTION (a) Field of the Invention

The present invention relates to a compact and high performance lens system for optical recording type disks.

(b) Description of the Prior Art

A lens system to be used for optical recording type disks should have a resolving power about $1\mu$ because it should read out the information recorded with high density. Besides, as it is necessary to move the lens system itself for the purpose of automatic focusing and for following up the track on the disk, the lens system should be small in size and light in weight. Moreover, to prevent the lens system from colliding against the disk and causing damage to the disk and/or lens system, the working distance of the lens system should be made long.

To obtain a high resolving power, which is one of the above-mentioned requirements, paraxial aberrations should be corrected favourably and, therefore, spherical aberration and sine condition should be made as small as possible. Besides, it is preferable to make the astigmatic difference small.

To make the lens system small in size and light in weight, the number of lenses constituting the lens system should be made as small as possible. The lens system disclosed in Japanese published unexamined patent application No. 45084/80 is known as an example of lens system for optical recording type disks (video disks) which is small in size and light in weight. However, this lens system has two-component two-element lens configuration as shown in FIG. 1. In case of the above-mentioned lens system, the airspace $d_2$ between the two lens components is $0.9f > d_2 > 0.6f$ when the focal length of the lens system as a whole is represented by reference symbol f, and the overall length of the lens system is long, i.e., about 1.2f. Moreover, the above-mentioned lens system comprises two lenses and it is not satisfactorily light in weight.

SUMMARY OF THE INVENTION

It is, therefore, a primary object of the present invention to provide a lens system for optical recording type disks comprising only one lens element, both surfaces of said lens element being formed as aspherical surfaces expressed by the formula of aspherical surface which includes at least the term proportional to the sixth power of the incidence height, said lens system being thereby arranged that paraxial aberrations and other aberrations are corrected favourably, the working distance is long, and the lens system itself is compact and light in weight.

The lens system according to the present invention is arranged to comprise only one lens element in order to fulfill the requirement to make the lens system small in size and light in weight. As this lens system has only two lens surfaces, it is considerably difficult to correct aberration. The lens system according to the present invention is arranged to correct aberration favourably by overcoming the above-mentioned difficulty in correction of aberrations by determining the power of the lens element as an adequate value and, at the same time, by forming both surfaces of the lens element as aspherical surfaces expressed by the formula shown below and, especially, determining the shape of the aspherical surface on the entrance side (light source side) as the optimum shape.

$$x = \frac{y^2}{r + r\sqrt{1 - p\left(\frac{y}{r}\right)^2}} + Ey^4 + Fy^6 + Gy^8 + \ldots$$

In the formula of aspherical surface shown in the above, reference symbol x represents the distance from a point on the lens surface to the tangential place which is tangential to said surface at the vertex thereof, reference symbol y represents the incidence height, reference symbol r represents the radius of curvature of the vertex portion of said surface, reference symbol p represents a coefficient of cone, and reference symbols E, F, G, ... respectively represent coefficients of aspherical surface in the terms proportional to the fourth power, sixth power, eighth power, ... of the incidence height.

The lens system for optical recording type disks according to the present invention is arranged as described in the above and, at the same time, arranged to fulfill the conditions (1) and (2) shown below.

$$-2.2 < p_1 < 1.1 \tag{1}$$

$$0.6 < \frac{n_1 - 1}{r_1} f < 1.4 \tag{2}$$

In the conditions shown in the above, reference symbol $p_1$ represents the coefficient of cone of the surface on the light source side, reference symbol $r_1$ represents the radius of curvature of the vertex portion of the surface on the light source side, reference symbol $n_1$ represents the refractive index of the lens element, and reference symbol f represents the focal length.

The formula of aspherical surface shown in the above expresses, when the terms of higher order are not taken into consideration, a spherical surface when $p=1$, a paraboloid of revolution when $p=0$, a hyperboloid of revolution when $p<0$, and an ellipsoid of revolution when the value of p is other than the above.

Now, the meanings of the conditions (1) and (2) are described below.

The condition (1) defines the basic shape of the aspherical surface which forms the first surface (surface on the light source side) of the lens system. If, in the condition (1), $p_1$ becomes larger than 1.1, the sine condition becomes unfavourable and it is impossible to make the quality of image formed by offaxial rays favourable. If, on the contrary, $p_1$ becomes smaller than $-2.2$, spherical aberration becomes large and the quality of image formed by paraxial rays become unfavourable.

The condition (2) is to determine the power of the first surface. If the power $$\frac{n_1 - 1}{r_1} f$$

of the first surface becomes larger than 1.4, astigmatism becomes large and, moreover, the sine condition cannot be corrected favourably. As a result, the quality of image formed by offaxial rays becomed unfavourable. If, on the contrary, the power $$\frac{n_1-1}{r_1}f$$

of the first surface becomes smaller than 0.6, it is impossible to correct spherical aberration favourably.

As described so far, the lens system for optical recording type disks according to the present invention is arranged to fulfill the requirements for a lens system for optical recording type disks by arranging that said lens system comprises only one lens element, both surfaces of said lens element are formed as aspherical surfaces, and said lens system fulfills the conditions (1) and (2). However, when the lens system according to the present invention is arranged to further fulfill the condition (3) shown below, it is possible to obtain a lens system with aberrations corrected more favourably.

$$0.8 < p_2 < 1.2 \tag{3}$$

In the condition (3) shown in the above, reference symbol $p_2$ represents the coefficient of cone of the surface on the disk side.

The condition (3) defines the basic shape of the aspherical surface which forms the surface on the disk side (the second surface) of the lens system and shows that said second surface is formed as an aspherical surface which is close to a spherical surface. Besides, the condition (3) also serves to correct spherical aberration and sine condition more favourably. When $p_2$ becomes larger than the upper limit of the condition (3) or smaller than the lower limit thereof, either spherical aberration or sine condition becomes unfavourable.

BRIEF DESCRIPTION OF THE DRAWINGS

FIGS. 3 through 9 respectively shows graphs illustrating aberration curves of Embodiments 1 through 7 of the lens system according to the present invention.

DETAILED DESCRIPTION OF THE PREFERRED EMBODIMENTS

Now, preferred embodiments of the lens system for optical recording type disks according to the present invention are shown below.

Embodiment 1
f = 1.0,          NA = 0.47,
image height (IMH) = 0.0217,      WD = 0.604
$r_1$ = 0.5998
$d_1$ = 0.3913      $n_1$ = 1.51032
$r_2$ = −2.6670
$p_1$ = −0.0576,    $E_1$ = 0.30066,    $F_1$ = 0.24115
$p_2$ = 1.0,        $E_2$ = 0.32443,    $F_2$ = −0.34312

Embodiment 2
f = 1.0,          NA = 0.47,
image height (IMH) = 0.0217,      WD = 0.490
$r_1$ = 0.5944
$d_1$ = 0.6087      $n_1$ = 1.48421
$r_2$ = −1.7396
$p_1$ = −0.0239,    $E_1$ = 0.28362,    $F_1$ = 0.26313
$p_2$ = 0.9892,     $E_2$ = 0.65332,    $F_2$ = −0.93755

Embodiment 3
f = 1.0,          NA = 0.47
image height (IMH) = 0.0217,      WD = 0.631
$r_1$ = 0.7187
$d_1$ = 0.3261      $n_1$ = 1.74289
$r_2$ = 17.7675
$p_1$ = −0.2877,    $E_1$ = 0.29521,    $F_1$ = 0.08997
$p_2$ = 1.0995,     $E_2$ = 0.09117,    $F_2$ = −0.10922

Embodiment 4
f = 1.0,          NA = 0.47,
image height (IMH) = 0.0217,      WD = 0.4734
$r_1$ = 0.7507
$d_1$ = 0.6087      $n_1$ = 1.76466
$r_2$ = 26.6347
$p_1$ = 0.0,        $E_1$ = 0.17651,    $F_1$ = 0.10206
$p_2$ = 1.15,       $E_2$ = 0.16472,    $F_2$ = −0.26929

Embodiment 5
f = 1.0,          NA = 0.47
image height (IMH) = 0.0217,      WD = 0.5884
$r_1$ = 0.5826
$d_1$ = 0.4239      $n_1$ = 1.48224
$r_2$ = −2.1367
$p_1$ = 0.15,       $E_1$ = 0.17919,    $F_1$ = 0.29948
$p_2$ = 0.97,       $E_2$ = 0.40890,    $F_2$ = −0.41237

Embodiment 6
f = 1.0,          NA = 0.47,
image height (IMH) = 0.0217,      WD = 0.4074
$r_1$ = 0.6326
$d_1$ = 0.6087      $n_1$ = 1.76466
$r_2$ = 2.1352
$p_1$ = 1.0,        $E_1$ = −0.08923,   $F_1$ = 0.13750
$p_2$ = 1.15,       $E_2$ = 0.74692,    $F_2$ = 6.6014

Embodiment 7
f = 1.0,          NA = 0.47
image height (IMH) = 0.0217,      WD = 0.5044
$r_1$ = 0.7896
$d_1$ = 0.6087      $n_1$ = 1.71128
$r_2$ = −4.8755
$p_1$ = −2.0,       $E_1$ = 0.55687,    $F_1$ = −0.71443
$p_2$ = 0.9,        $E_2$ = −0.06848,   $F_2$ = −0.31462

In the embodiments shown in the above, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $p_1$ and $p_2$ respectively represent the coefficients of cone of the first and second surfaces, reference symbols $E_1$ and $F_1$ respectively represent the coefficients of aspherical surface of the first surface, and reference symbols $E_2$ and $F_2$ respectively represent the coefficients of aspherical surface of the second surface.

Figure 1:
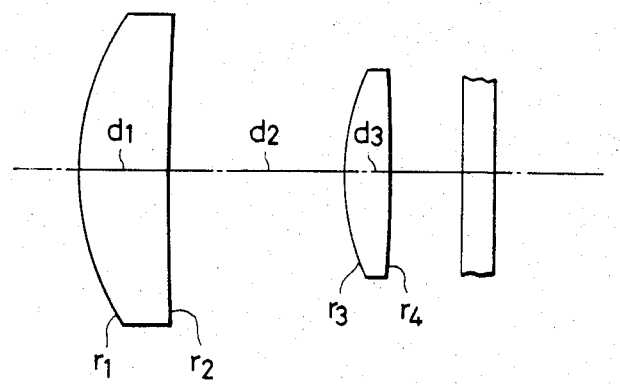
FIG. 1 shows a sectional view of a known lens system for optical recording type disks.
Figure 2:
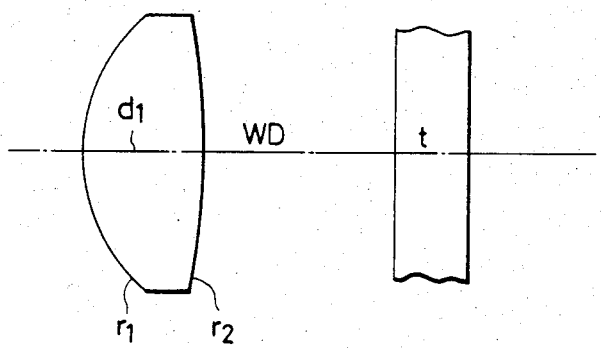
FIG. 2 shows a sectional view of the lens system for optical recording type disks according to the present invention.
Figure 5:
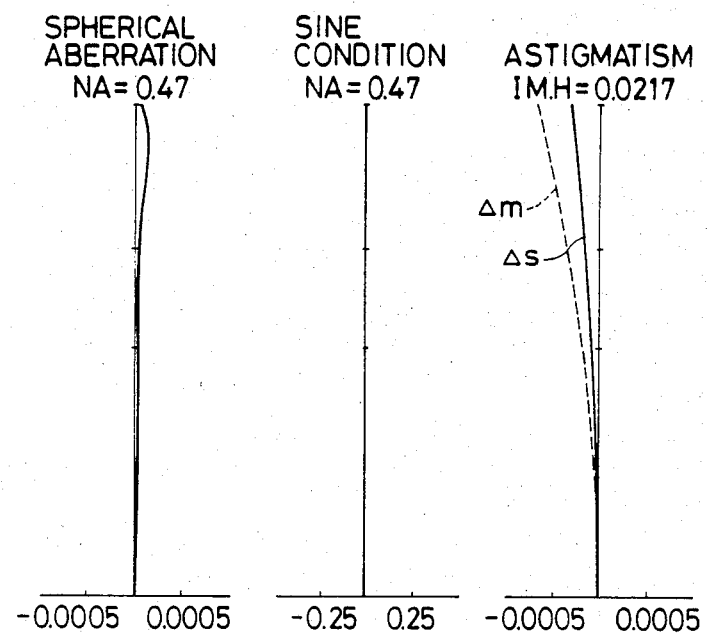
Figure 6:
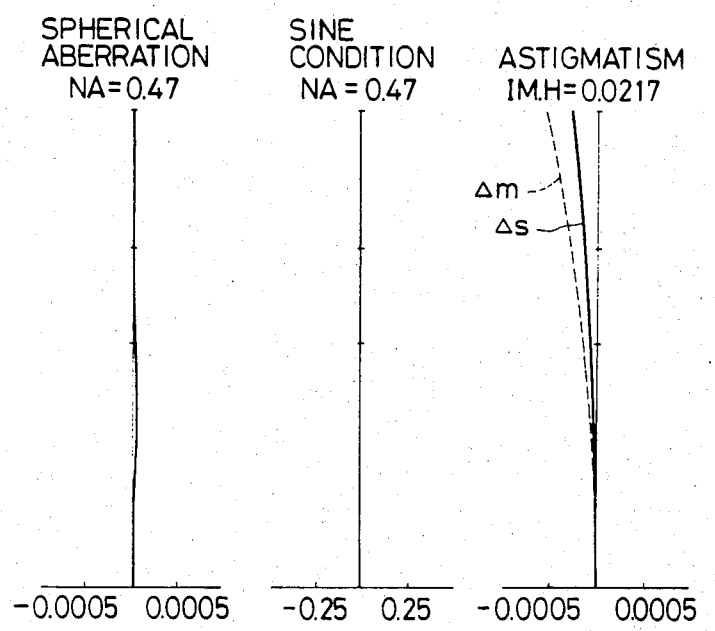
Figure 7:
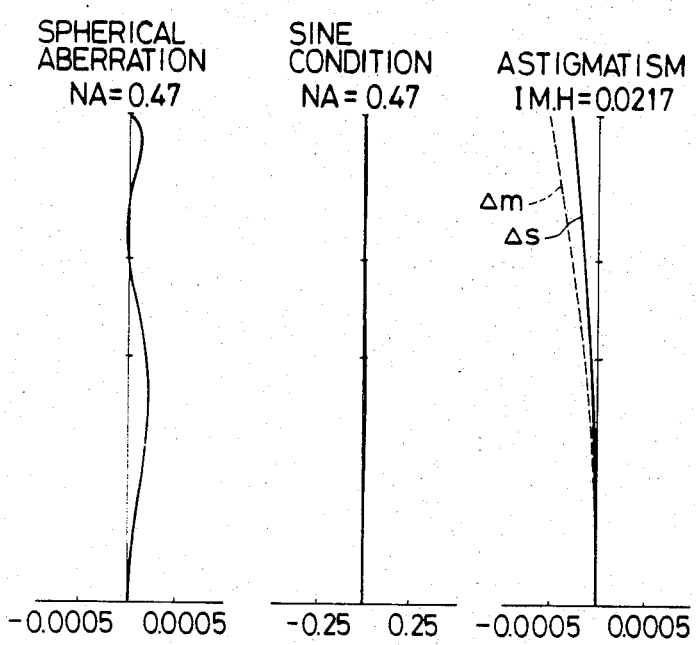
Figure 8:
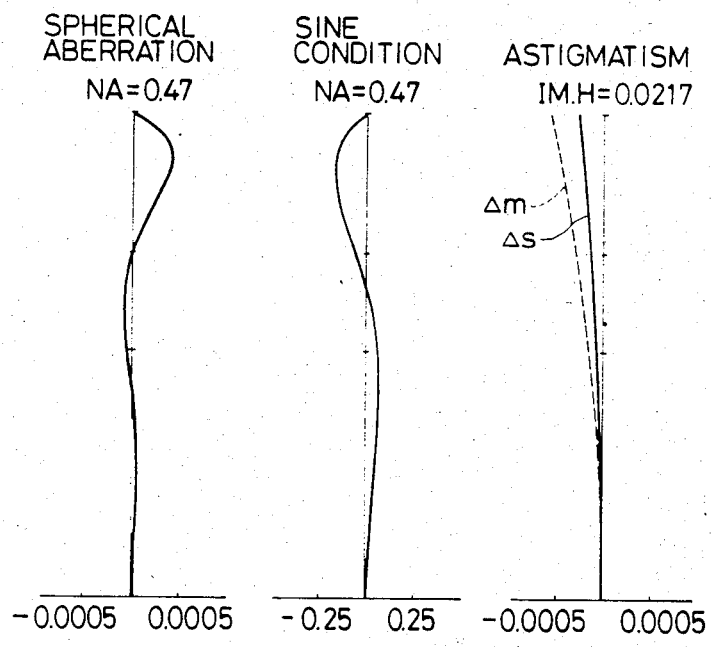

For the lens system according to respective embodiments shown in the above, the rays that enter them are parallel rays. Therefore, for respective embodiments shown in the above, aberrations are corrected so that aberrations become most favourable when parallel rays enter them from the light source side. The values of refractive index $n_1$ of respective embodiments shown in the above represent the values when $\lambda = 800$ nm, and aberrations are corrected so that they become the smallest when the light of this wavelength is used. Aberration curves of these embodiments are respectively shown in FIGS. 3 through 9. These aberration curves represent those for the wavelength $\lambda = 800$ nm. The sine conditions of Embodiments 3 and 4 almost coincide with the axis of ordinates and, therefore, the curves showing the sine conditions in FIGS. 5 and 6 cannot be distinguished from the axis of ordinates. The cover glasses used in respective embodiments shown in the above have the thickness $t = 0.2609$ and refractive index $n = 1.48821$.

As described in detail in the above and as it is evident from respective embodiments, the lens system for optical recording type disks according to the present invention is arranged to comprise only one lens element in order to make the lens system small in size and light in weight and, at the same time, aberrations thereof are corrected favourably by forming both surfaces of said lens element as aspherical surfaces and by selecting the optimum shapes of aspherical surfaces.

I claim:

1. A lens system for optical recording type disks comprising one lens element with the entrance surface formed as a convex surface, both surfaces of said lens element being formed as aspherical surfaces expressed by the formula of aspherical surface including at least the term proportional to the sixth power of the incidence height as shown below and said lens system being arranged to fulfill the conditions (1), (2) and (3) shown below:

$$x = \sqrt{\frac{y^2}{r + r\sqrt{1 - p\left(\frac{y}{r}\right)^2}}} + Ey^4 + Fy^6 + Gy^8 + \ldots$$

$$-2.2 < p_1 < 1.1 \quad (1)$$

$$0.6 < \frac{n_1 - 1}{r_1} f < 1.4 \quad (2)$$

$$0.8 < p_2 < 1.2 \quad (3)$$

where, reference symbol x represents the distance from a point on the lens surface to the tangential plane which is tangential to said surface at the vertex thereof, reference symbol y represents the incidence height, reference symbol r represents the radius of curvature of the vertex portion of the surface, reference symbol $r_1$ represents the radius of curvature of the vertex portion of the first surface, reference symbol p represents the coefficient of cone, reference symbol $p_1$ represents the coefficient of cone of the first surface, reference symbol $p_2$ represents the coefficient of cone of the second surface, reference symbols E, F, G, etc., respectively represent coefficients of aspherical surface in the terms proportional to the fourth power, sixth power, eighth power etc. of the incidence height, reference symbol $n_1$ represents the refractive index of the lens element, and reference symbol f represents the focal length of the lens system for optical recording type disks.

2. A lens system for optical recording type disks according to claim 1, in which said lens system for optical recording type disks has the following numerical data:

| | | |
|---|---|---|
| f = 1.0, | NA = 0.47 | |
| image height (IMH) = 0.0217, | | WD = 0.604 |
| $r_1$ = 0.5998 | | |
| $d_1$ = 0.3913 | $n_1$ = 1.51032 | |
| $r_2$ = −2.6670 | | |
| $p_1$ = −0.0576, | $E_1$ = 0.30066, | $F_1$ = 0.24115 |
| $p_2$ = 1.0, | $E_2$ = 0.32443, | $F_2$ = −0.34312 | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

3. A lens system for optical recording type disks according to claim 1, in which said lens system for optical recording type disks has the following numerical data:

| | | |
|---|---|---|
| f = 1.0, | NA = 0.47 | |
| image height (IMH) = 0.0217, | | WD = 0.490 |
| $r_1$ = 0.5944 | | |
| $d_1$ = 0.6087 | $n_1$ = 1.48421 | |
| $r_2$ = −1.7396 | | |
| $p_1$ = −0.0239, | $E_1$ = 0.28362, | $F_1$ = 0.26313 |
| $p_2$ = 0.9892, | $E_2$ = 0.65332, | $F_2$ = −0.93755 | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

4. A lens system for optical recording type disks according to claim 1, in which said lens system for optical recording type disks has the following numerical data:

| | | |
|---|---|---|
| f = 1.0, | NA = 0.47 | |
| image height (IMH) = 0.0217, | | WD = 0.631 |
| $r_1$ = 0.7187 | | |
| $d_1$ = 0.3261 | $n_1$ = 1.74289 | |
| $r_2$ = 17.7675 | | |
| $p_1$ = 0.2877, | $E_1$ = 0.29521, | $F_1$ = 0.08997 |
| $p_2$ = 1.0995, | $E_2$ = 0.09117, | $F_2$ = −0.10922 | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

5. A lens system for optical recording type disks according to claim 1, in which said lens system for optical recording type disks has the following numerical data:

| | | |
|---|---|---|
| f = 1.0, | NA = 0.47 | |
| image height (IMH) = 0.0217, | | WD = 0.4734 |
| $r_1$ = 0.7505 | | |
| $d_1$ = 0.6087 | $n_1$ = 1.76466 | |
| $r_2$ = 26.6347 | | |
| $p_1$ = 0.0, | $E_1$ = 0.17651, | $F_1$ = 0.10206 |
| $p_2$ = 1.15, | $E_2$ = 0.16472, | $F_2$ = −0.26929 | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

6. A lens system for optical recording type disks according to claim 1, in which said lens system for optical recording type disks has the following numerical data:

| | | |
|---|---|---|
| $f = 1.0$, | NA = 0.47 | |
| image height (IMH) = 0.0217, | | WD = 0.5884 |
| $r_1 = 0.5826$ | | |
| $d_1 = 0.4239$ | $n_1 = 1.48224$ | |
| $r_2 = -2.1367$ | | |
| $p_1 = 0.15$, | $E_1 = 0.17919$, | $F_1 = 0.29948$ |
| $p_2 = 0.97$, | $E_2 = 0.40890$, | $F_2 = -0.41237$ | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

7. A lens system for optical recording type disks according to claim 1, in which said lens system for optical recording type disks has the following numerical data:

| | | |
|---|---|---|
| $f = 1.0$, | NA = 0.47 | |
| image height (IMH) = 0.0217, | | WD = 0.4074 |
| $r_1 = 0.6326$ | | |
| $d_1 = 0.6087$ | $n_1 = 1.76466$ | |
| $r_2 = 2.1352$ | | |
| $p_1 = 1.0$, | $E_1 = -0.08923$, | $F_1 = 0.13750$ |
| $p_2 = 1.15$, | $E_2 = 0.74692$, | $F_2 = 6.6014$ | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

8. A lens system for optical recording type disks according to claim 1, in which said lens system for optical recording type disks has the following numerical data:

| | | |
|---|---|---|
| $f = 1.0$, | NA = 0.47 | |
| image height (IMH) = 0.0217, | | WD = 0.5044 |
| $r_1 = 0.7896$ | | |
| $d_1 = 0.6087$ | $n_1 = 1.71128$ | |
| $r_2 = -4.8755$ | | |
| $p_1 = -2.0$, | $E_1 = 0.55687$, | $F_1 = -0.71443$ |
| $p_2 = 0.9$, | $E_2 = -0.06848$, | $F_2 = -0.31462$ | where, reference symbols $r_1$ and $r_2$ respectively represent radii of curvature of vertex portions of respective surfaces of the lens element, reference symbol $d_1$ represents the thickness of the lens element, reference symbol $n_1$ represents the refractive index of the lens element, reference symbols $E_1$ and $F_1$ respectively represent the coefficients of aspherical surface of the first surface, and reference symbols $E_2$ and $F_2$ respectively represent the coefficients of aspherical surface of the second surface.

* * * * *